United States Patent Office 3,078,518
Patented Feb. 26, 1963

3,078,518
METHOD FOR PRODUCING ROUNDED
CONTACT MASSES
Alfred J. Robinson, South Plainfield, and Walter L. Haden, Metuchen, N.J., assignors to Minerals & Chemicals Philipp Corporation, Menlo Park, N.J., a corporation of Maryland
No Drawing. Filed Aug. 7, 1961, Ser. No. 129,523
7 Claims. (Cl. 18—47.5)

This invention relates to the production of rounded contact masses composed of acid-activated clay.

In essence, the subject invention relates to an improvement in properties of rounded masses which are produced by the oil tumbling method that is disclosed and claimed in a copending U.S. patent application Serial No. 728,034, filed April 14, 1958, now Patent 3,024,206, by James B. Duke, and entitled "Method for Producing Rounded Plastic Masses." In accordance with the teachings of said copending application, plastic granules, especially extruded pellets, comprising a comminuted mineral and an aqueous liquid are rounded without removal of material therefrom by tumbling the granules while in contact with a low viscosity hydrocarbon liquid which is nonreactive with the granules for a time sufficient to deform angularities in the granules. In accordance with one form of the invention, spherical contact masses are produced from kaolin clay by using this rounding method in conjunction with a method for producing active contact masses from kaolin clay which is the subject matter of U.S. 2,967,157 to Alfred J. Robinson and James V. Weir, entitled "Activation of Clay by Acid Treatment and Calcination." In accordance with that embodiment of the invention, kaolin clay is mixed with about a 60 to 125 percent dosage (defined hereafter) of concentrated sulfuric acid; the mixture is extruded to form pellets of plastic consistency and the pellets, while still of plastic consistency, are tumbled in the presence of a low viscosity hydrocarbon liquid in rotating means for a time sufficient to deform the angular pellets into spheres without removal of material therefrom. The pellets are then aged in the absence of air, preferably in the presence of a hydrocarbon liquid, thereby to complete reaction between acid and alumina of the clay, thus converting the spheres into a nonplastic state. The spheres, without being washed to remove water-soluble reaction products therefrom, are then calcined at a temperature and for a time sufficient to eliminate residual hydrocarbon liquid and to eliminate substantially completely the sulfate content of the spheres.

Commercially acceptable spherical active contact masses have been produced from kaolin clay by the procedure described above. The Houdry 4-ball hardness value of the commercial spheres normally varies during production within the range of from about 95 to 99 percent, with variations resulting from small variations in procedure and imponderables. While this range of 4-ball hardness values compares favorably with the hardness of other aluminum silicate catalysts, the 4-ball hardness value of only 95 percent which periodically occurs during commercial production is only borderline for a grade A catalyst. On occasion there result spheres having unacceptable hardness values as low as within the range of 90 to 95 percent.

This invention is a result of a surprising discovery that spherical acid-activated kaolin clay contact masses having a 4-ball hardness value of at least 98 percent can be consistently produced by a simple inexpensive modfication of the procedure described in said copending application of James B. Duke.

Stated briefly, in accordance with this invention, a small quantity of an organic amine is incorporated with kaolin clay and sulfuric acid and uniformly admixed therewith before the formation of plastic angular pellets from the mixture of kaolin clay and acid. The resulting mixture is pelletized and the pellets are subjected to oil tumbling to round the pellets into essentially spherical form, followed by aging and thermal desulfation, as described above.

The presence of the amine in the unreacted clay-acid reaction mixture, for reasons not presently understood, results in a spectacular improvement in minimum Houdry 4-ball hardness of the ultimate thermally desulfated acid-activated kaolin clay spheres to a value of 98 percent and, further, the hardness value during production on a continuous basis is considerably less subject to fluctuation than is the hardness of spheres produced in the absence of amine in the reaction mass. Thus, for example, where spheres varying from 90 to 99 percent in Houdry 4-ball hardness were formerly obtained during continuous production, spheres of hardness of 98 to 99 are consistently obtained when a small amount of organic amine is uniformly mixed with acid and clay before such mixture is formed into granular particles and then oil tumbled. Whatever the explanation for this phenomenon, it is significant that the presence of the amine in the reaction mass has little or no effect on the hardness of aged desulfated acid-activated clay pellets produced in the same manner but without the oil tumbling step. In other words, the effect of the amine in bringing about improved catalyst hardness is correlated in some manner with the oil tumbling step which converts angular pellets into the desired spherical form.

In addition to the benefit described above, the incorporation of amine in an unreacted clay-acid mixture, in accordance with this invention, improves substantially the Cat-C selectivity of the kaolin catalyst spheres, thereby improving the value of the catalyst in certain cracking operations which are carried out in the absence of steam.

In putting this invention into practice, the use of higher fatty acid ($C_8$ to $C_{18}$) amines or mixtures of higher fatty amines is preferred. Primary fatty amines are available commercially in distilled, undistilled and/or still bottom grades and are obtained from tall oil fatty acids, caprylic, capric, lauric, myristic, palmitic and stearic acids and also from mixed acids obtained from soybean oil, coconut oil, tallow and hydrogenated tallow. Fatty acid amines are usually produced by catalytic hydrogenation of fatty acid nitriles at about 150° C.; these nitriles, in turn, are produced by reaction of ammonia with a higher fatty acid or a mixture of such acids. The catalytic hydrogenation product generally comprises about 85 percent primary amine, with the balance secondary amines and minor quantities of tertiary amines. Secondary fatty amines are prepared in the same way except that catalytic hydrogenation is carried out at a higher temperature. The amines may be used as free amines or salts of inorganic acids (e.g., sulfuric, phosphoric, hydrochloric) or organic acids (e.g., acetic, formic, stearic, lactic, maleic, butyric, caproic). Amines of resin acids, such as dehydroabietyl amine are generally similar to amines of higher fatty acids and should be as satisfactory as the higher fatty acid amine. Other organic amines include liquid or solid aliphatic, aromatic, aralkyl, alicyclic and heterocyclic amines, as well as alkylolamines and quaternary ammonium compounds. Such amines may be monoamines or polyamines and may be incorporated as free amines or as mineral acid or organic acid salts. As examples of such amines may be mentioned: pyridine, dodecylamine, quinoline, ethanolamines, alkylene polyamines such as diethylenetriamine, cetylpyridium ammonium chloride, dimethyldioctadecyl ammonium acetate, morpholine, imidazolines such as heptadecenylimidazoline, amido-amines such as those obtained by condensation of ethylene diamine and higher fatty acids, and N-aliphatic alkylene polyamines such as N-tallow trimethylene diamine.

Only a small quantity of amine is incorporated into the clay-acid feed to the extruder. Generally speaking, an amine dosage within the range of about 0.02 to 0.50 percent will suffice, dosage being defined as the weight of 100 percent amine per unit weight of volatile free clay expressed on a percentage basis. Volatile free clay weight is the weight of clay after it has been heated to essentially constant weight at about 1800° F. The optimum quantity of amine will vary of course with species of amine and is readily determined by evaluation of Houdry 4-ball hardness of the ultimate kaolin catalyst spheres. An excessive dosage of amine, such as a 5 percent dosage will significantly reduce the hardness of the ultimate catalyst spheres. A dosage less than about 0.02 percent is relatively ineffectual.

A preferred procedure for incorporating the amine in the extruder feed is to mix the amine into the acid with agitation and then mix clay with the amine-acid composition. The reason for this procedure, especially applicable using amines of fatty acids, is to solubilize the amine and put it into a form in which it may be mixed to apparent homogeneity with the appreciably larger quantities of acid and clay. Mixing of amine and acid may be carried out at room temperature, preferably with agitation. The amine-acid mixture may be held for a day or considerably longer after its preparation. As mentioned in U.S. 2,967,157, the amount of sulfuric acid used in the process for acid activating kaolin clay is from 60 to 125 percent of 100 percent acid, based on the volatile free weight of the clay—viz., a 60 to 125 percent acid dosage. Therefore, the volume of amine is very small as compared with the volume of acid used in the process. A preferred acid dosage is about 80 percent. The concentration of sulfuric acid is between 90 and 100 percent, with 66 Bé. (about 93 percent $H_2SO_4$) being eminently suitable. It is within the scope of this invention to substitute phosphoric acid for a portion, up to about 50 percent by weight, of the sulfuric acid.

The mixing of amine, concentrated sulfuric acid and kaolin may be carried out in any suitable equipment, such as, for example, a pug mill. The resulting plastic mixture is formed into so-called "pellets" of appropriate size by any molding or extrusion method known to those skilled in the art. Generally speaking, the pellets should be of a size such that when deformed by oil tumbling there will result rounded particles within the range of about 4 to about 10 mesh. This invention, however, is not limited to the production of spheres or substantially spherical masses of this size since somewhat smaller and somewhat larger masses may be more useful for certain contact processes. For best results in extrusion, the volatile matter (V.M.) of the mix should be within the range of about 30 to 65 percent, preferably about 45 to 55 percent. The term "volatile matter" as used herein refers to the weight percentage of a material eliminated when it is heated essentially to constant weight at about 1800° F. The freshly extruded pellets, while still of plastic consistency, are immersed in a hydrocarbon liquid in which they are tumbled. The hydrocarbon liquid is one which is substantially nonreactive with the constituents of the pellets and is used in amount within the range of from about 25 to 125 pounds of pellets per 100 pounds of hydrocarbon liquid, preferably 50 to 100 pounds of pellets per 100 pounds of hydrocarbon liquid. As for the hydrocarbon liquid, saturated hydrocarbons are suitable, especially petroleum hydrocarbons of paraffinic or naphthenic base. Preferred are saturated hydrocarbon mixtures boiling above about 500° F., such as gas oil feed stock ($C_{15}$ to $C_{18}$) and mineral oil ($C_{16}$ to $C_{20}$). White mineral oil is especially recommended. Kerosene and gasoline may be used if appropriate equipment is available.

As mentioned above, the tumbling of the pellets in hydrocarbon liquid to deform them into spheres is carried out with a hydrocarbon liquid having a low viscosity so that the pellets will have a high degree of mobility in the liquid. Oil having a viscosity of the order of about 30 to about 40 S.S.U. is recommended. Hydrocarbon liquids such as mineral oil which have a high flash point are generally too viscous at ambient temperature for carrying out the tumbling step. Therefore when tumbling is carried out at ambient temperature with oil that is normally viscous, the oil should be thinned with a suitable solvent. As an example of such a blend is a mixture of 1 part of white mineral oil thinned with 3 parts by weight of mineral spirits to a viscosity of 31 S.S.U. at 76° F. Unthinned high flash hydrocarbon liquids are eminently suitable if during the pellet tumbling step they are heated to an elevated temperature which is below their flash point and which is also below the temperature at which the green pellets will lose their plasticity before tumbling is completed. Thus, unthinned mineral oil heated to a temperature within the range of about 225° F. to 270° F. can be used in the tumbling step. However, with some clay-acid compositions oil at a temperature as high as about 300° F. will be satisfactory.

The pellets, immersed in low viscosity hydrocarbon liquid, are then tumbled in rotating means, preferably in a partially filled drum rotating about its horizontal axis at a speed less than critical. The term "critical speed" refers to the speed at which the pellets rotate at the same speed as the periphery of the drum. The drum may be lined lengthwise on its inner surface with corrugations for the purpose of improving the capacity of the drum. The drum charge is rolled for a time sufficient to effect the desired deformation of the angular plastic pellets into spheres. This time varies somewhat with drum speed, ratio of oil to pellets and drum construction and may range from about 2 minutes up to about a half hour.

The preferred medium for aging the rounded pellets is hot oil, as described and claimed in a copending application of Alfred J. Robinson and James V. Weir, Serial No. 53,625, filed September 2, 1960, which is a continuation-in-part of Serial No. 499,515, filed April 5, 1955, now abandoned. The aging oil may be the same oil used in the tumbling step, with appropriate adjustment of solids content by partial removal of oil from the rounded pellets or by addition of supplementary oil to the rounded pellets. It may be preferable to separate the spheres from the oil used in the tumbling step and to carry out the aging of the spheres in fresh oil. Reference is made to the copending application Serial No. 53,625, for details of suitable compositions of aging oil and apparatus. As mentioned in said application, the optimum temperature for oil aging falls within the limits of from about 220° F. to about 400° F., and optimum times of aging within the range from 1 to 24 hours, with the time required depending on the temperature used. It is preferable to age within a temperature range from 275° F. to 325° F. for a time within the range of from 2 to 5 hours. When aging temperatures become too high, the clay-acid reaction proceeds rapidly and the hardness of the final product is sacrificed. When aging temperatures are too low, the product is also soft but in this case the cause seems to stem from insufficient reaction due to a very slow reaction rate.

The calcining of the aged kaolin clay spheres should be carried out preferably at a temperature and for a time sufficient to render the spheres substantially completely sulfate free and to eliminate substantially completely the oil associated with the spheres. In most cases a temperature of from about 900° F. to about 1600° F., depending on the atmosphere, and a time of between 1 and 24 hours is sufficient. The presence of reducing elements in the calcination atmosphere permits desulfation to take place below the normal decomposition temperature of aluminum sulfate (1423° F.). It is particularly important that substantially all sulfates be decomposed with accompanying loss of oxides of sulfur during the calcination if the final product is to be used as a cracking catalyst since sulfates are very undesirable therein. When calcination temperatures much below 900° F. are used, decomposition is incomplete and when they exceed 1600° F., final surface area is lowered. However, all calcination temperatures outside of the 900° F. to 1600° F. range are not to be excluded since some utility would accrue from calcination at temperatures somewhat lower than 900° F. and at temperatures higher than 1600° F. (say up to 1800° F.), especially where the final contact materials are intended for uses other than as catalysts.

While the various modifications of the process noted above represent the preferred embodiments thereof, it is to be understood that other modifications falling within the scope of this invention are entirely possible.

Following is an example included for purposes of illustration. This example shows that sulfuric acid-activated kaolin clay spheres having a minimum 4-ball hardness of 98 percent may be consistently produced by incorporating an organic amine in the acid-clay extruder charge. Also shown is the improvement in Cat-C selectivity of the finished spherical contact masses.

In a continuous commercial operation producing kaolin catalyst spheres by oil tumbling an extruded mixture of clay and concentrated sulfuric acid, oil aging and reductive sulfation, an organic amine was incorporated into the acid stream after the process had been in continuous operation without amine.

The kaolin clay employed in the process was a clay from Georgia which had been refined to eliminate sand, mica and water-soluble salts and which contained about 14 percent volatile matter. Its approximate analysis, on a volatile free weight basis, was as follows:

| | Percent |
|---|---|
| $SiO_2$ | 52.3 |
| $Al_2O_3$ | 45.6 |
| $Fe_2O_3$ | 0.4 |
| $TiO_2$ | 1.7 |
| | 100.0 |

The organic amine used in the production of experimental catalyst spheres was a commercial product supplied under the trade name "Mixed Crude Amines—Type T." This amine is understood to be a mixture of aliphatic straight chain amines, probably all primary amines, obtained as the still bottom fraction obtained by distillation of a mixture of amines obtained from coconut oil, soybean oil and tallow. The melting point of the amine is in the 70° F. to 80° F. range.

The operation was started up by continuously mixing kaolin clay with 80 percent dosage of sulfuric acid (93.2 percent concentration) in a pugger. The pugged mixture was continuously formed into cylindrical pellets about 3/16 inch in diameter and about 3/16 inch long by feeding the pugged mixture to an auger mill which was provided with a circular die plate. The extruded material was cut into pellets of the size noted above by cutter blades upon emergence from the die plate.

The freshly prepared green unaged pellets were continuously charged to a horizontal drum containing circulating mineral oil heated to an inlet temperature of 250° F. The drum was 6 feet in diameter by 12 feet long and was lined on its inner surface with corrugated attrition-resistant tiles. The drum was continuously rotated about its longitudinal axis at about 24 r.p.m. and the oil temperature in the drum was maintained at about 250° F. Pellet retention time in the drum was about 8 minutes. The resulting spheres and accompanying oil were then discharged into a vertical aging vessel through which mineral oil at about 285° F. was continuously circulated. Sphere retention time in the hot oil was about 3 hours. The oil aged spheres were conveyed to a calciner where steam and hot flue gases containing reducing components (products from the combustion of gas in an atmosphere deficient in oxygen) were continuously circulated through the pellets in the calciner thus supplying the heat requisite for desulfation of the pellets. During operation the temperature of the calciner averaged about 1450° F. and residence time was 24 hours.

After operating in this manner for several hours, the Mixed Crude Amine—Type T was incorporated in the acid stream, in accordance with this invention, as follows.

27,000 pounds of 93.2 percent $H_2SO_4$ was charged to a feed preparation tank and circulated by a pump. A 36 pound batch of heat liquefied amine was charged to the acid tank through a manhole in the roof of the tank and the acid-amine mixture was circulated for 12 hours at room temperature to insure thorough mixing. The amine-acid mixture was then continuously pugged with kaolin clay, as described above, using about an 80 percent acid dosage and the extruder product was carried through the oil tumbling, oil aging and reductive thermal desulfation steps without variation in the operation of the plant.

a. The catalyst spheres produced throughout the process were evaluated for Houdry 4-ball hardness.

In carrying out the Houdry 4-ball hardness test, a sample of catalyst spheres was separated into three fractions by screening through 3-mesh and 5-mesh sieves until about 200 grams of the 3/5-mesh fraction was obtained. The 3/5-mesh fraction was heat treated at 1050° F. for 1 hour. The heat-treated material was poured into a tared 100 cc. graduate to the 80 cc. mark, with tapping to gently pack the particles. The weight of the 80 cc. of catalyst particles was determined and they were then placed in a stainless steel cylindrical container with four polished stainless steel ball bearings, each of 15/16-inch diameter. The container was closed tightly and it was then rotated for about 1 hour about its longitudinal axis at about 80 r.p.m. The container was rotated by means of a roller arrangement. After the rotation had ceased, the catalyst solids in the container were screened on a 6-mesh sieve and the hardness calculated as the percentage of total sample (i.e., the 80 cc.) weight represented by the plus 6-mesh fraction of the final material. Tyler screens were used in making the determinations.

The catalyst spheres produced without amine addition fluctuated during production between about 94.0 percent and 96.0 percent in Houdry 4-ball hardness, averaging about 95 percent in hardness. The spheres produced with amine, however, had Houdry 4-ball hardness values ranging between about 98.0 percent and 99.3 percent, averaging 98.5 percent. This indicates that catalyst spheres produced with the addition of amine and reductive desulfation consistently exceed the A grade ball mill hardness specification of 95 percent.

b. In evaluating catalytic selectivity of experimental spheres, a sample of calciner discharge was taken in the heart of the experimental production period when amine was present in the extruder feed. This material was steamed at 1500° F. for 4 hours and evaluated first under Cat-D and then Cat-C test conditions. These properties were compared with those of a representative production product made without amine.

The Cat D-1 performance of the experimental spherical kaolin catalyst, made with amine in accordance with this invention, was comparable in all respects with a commercial spherical kaolin catalyst, produced in the same manner but without use of amine. Thus, the Cat D-1 properties of the experimental spherical catalyst were as follows:

TABLE I

*Catalytic Evaluation (Cat D-1 Test) of Catalyst Spheres*

|  | Cat D-1 test |
|---|---|
| Gasoline, vol. percent | 35.8 |
| Gasoline, wt. percent | 31.5 |
| Coke, wt. percent | 3.8 |
| Gas, wt. percent | 18.2 |
| Conversion, wt. percent | 53.5 |
| Gas gravity | 1.47 |
| Coke factor | 0.92 |
| Gas/coke, w./w. | 8.3 |
| Cracking efficiency, wt. percent | 59 |
| Percent steam during cracking | 10 |

A comparison of the Cat C-2 properties of kaolin catalyst spheres made with amine and without amine is given in Table II.

TABLE II

*Catalytic Evaluation (Cat C-2) of Catalyst Spheres-Amine Addition Test*

| Catalyst Spheres Test | 0.1% Amine Dosage | Without Amine Addition |
|---|---|---|
| Gasoline, Vol. Percent | 34.8 | 34.9 |
| Gasoline, Wt. Percent | 30.6 | 30.7 |
| Coke, Wt. Percent | 4.2 | 6.2 |
| Gas, Wt. Percent | 15.8 | 18.0 |
| Conversion, Wt. Percent | 50.6 | 54.9 |
| Gas Gravity | 1.34 | 1.46 |
| Coke Factor | 1.14 | 1.27 |
| Gas/Coke, w./w. | 7.3 | 5.0 |
| Cracking Efficiency, Wt. Percent | 60 | 56 |
| Percent Steam During Cracking | 0 | 0 |

These data show that Cat C-2 performance (cracking in absence of steam) of the experimental spheres is superior to the control in several respects. The gasoline yield is higher, the coke and gas yields are lower, and the gas gravity is equal to that of the control. As a result, coke factor, gasoline/coke ratio and cracking efficiency are all improved due to the addition of amine. This improved selectivity when cracking in the absence of steam is of substantial commercial significance in many refineries.

We claim:

1. In a method for the preparation of rounded contact masses from kaolin clay comprising the steps of mixing the clay with from about 60 to 125 percent dosage of concentrated sulfuric acid, extruding the mixture to form pellets of plastic consistency, contacting said pellets while still of plastic consistency with a low viscosity hydrocarbon liquid, tumbling said pellets while still of plastic consistency and in the presence of said hydrocarbon liquid for a time sufficient to deform said pellets into substantially spherical form without removal of material therefrom, aging the spheres at a temperature and for a time sufficient to complete reaction between said acid and alumina of said clay, thus converting said spheres to a nonplastic state and then, without washing out water-soluble reaction products, calcining said spheres at a temperature and for a time sufficient to eliminate substantially completely said hydrocarbon liquid and to eliminate substantially completely the sulfate content of said spheres, thereby producing active rounded contact masses, the improvement comprising mixing said acid and said kaolin clay, prior to the extrusion thereof, with a small quantity of an organic amine.

2. The method of claim 1 wherein said organic amine is a higher fatty acid amine.

3. The method of claim 1 wherein said organic amine is a residue resulting from distillation of amines of mixed higher fatty acids, said residue consisting predominantly of primary aliphatic amines.

4. The method of claim 1 wherein said amine is employed in amount of about 0.1 percent based on the weight of said kaolin clay, volatile free clay basis.

5. In a method for the preparation of rounded contact masses from kaolin clay comprising the steps of mixing the clay with from about 60 to 125 percent dosage of concentrated sulfuric acid, extruding the mixture to form pellets of plastic consistency, contacting said pellets while still of plastic consistency with a low viscosity hydrocarbon liquid, tumbling said pellets while still of plastic consistency and in the presence of said hydrocarbon liquid in rotating means for a time sufficient to deform said pellets into substantially spherical form without removal of material therefrom, aging the spheres at a temperature and for a time sufficient to complete reaction between said acid and alumina of said clay, thus converting said spheres to a nonplastic state and then, without washing out water-soluble reaction products, calcining said spheres at a temperature and for a time sufficient to eliminate substantially completely said hydrocarbon liquid and to eliminate substantially completely the sulfate content of said spheres, thereby producing active rounded contact masses, the improvement comprising dissolving a primary higher fatty acid amine in said sulfuric acid before mixing said acid with said kaolin clay, using said amine in amount of about 0.1 percent based on the weight of said clay, volatile free clay basis.

6. The method of claim 5 wherein said amine is produced from mixed acids obtained from coconut oil, soybean oil and tallow.

7. The method of claim 5 wherein said low viscosity hydrocarbon liquid comprises mineral oil reduced in viscosity by being held at a temperature within the range of from about 200° F. to about 300° F.

References Cited in the file of this patent

UNITED STATES PATENTS

| 2,797,196 | Dunn et al. | June 25, 1957 |
| 2,967,158 | Malone | Jan. 3, 1961 |

FOREIGN PATENTS

| 571,289 | Canada | Feb. 24, 1959 |